United States Patent
Takeishi

(10) Patent No.: US 8,526,022 B2
(45) Date of Patent: Sep. 3, 2013

(54) IMAGE FORMING APPARATUS, CONTROL METHOD AND COMPUTER-READABLE MEDIUM

(75) Inventor: Hiroki Takeishi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 762 days.

(21) Appl. No.: 12/756,468

(22) Filed: Apr. 8, 2010

(65) Prior Publication Data

US 2010/0290070 A1  Nov. 18, 2010

(30) Foreign Application Priority Data

May 18, 2009 (JP) .................................. 2009-120395

(51) Int. Cl.
*G06F 3/12*    (2006.01)

(52) U.S. Cl.
USPC .......... 358/1.13; 358/2.1; 358/3.23; 358/1.15

(58) Field of Classification Search
USPC ................... 358/1.2, 1.4, 1.9, 2.1, 3.11, 3.12, 358/3.23, 3.24, 1.15, 1.16, 1.17, 1.13
See application file for complete search history.

(56) References Cited

U.S. PATENT DOCUMENTS 6,067,097 A    5/2000 Morita et al.

FOREIGN PATENT DOCUMENTS

JP    10307924 A    11/1998

OTHER PUBLICATIONS

"Canon technology UFR/LIPS V" (URL: http://web.canonjp/technology/canon_tech/explanation/hspeed_processing.html), Apr. 20, 2010.

*Primary Examiner* — Vu B Hang
(74) *Attorney, Agent, or Firm* — Fitzpatrick, Cella, Harper & Scinto

(57) ABSTRACT

Processing is optimized in advance during interpretation of PDL data, so as to accelerating rendering processing during processing associated with image formation. To this end, it is determined whether or not the addition of intermediate data based on PDL data during interpretation to that which is already generated during the processing associated with image formation considerably reduces a speed of the rendering processing.

12 Claims, 13 Drawing Sheets

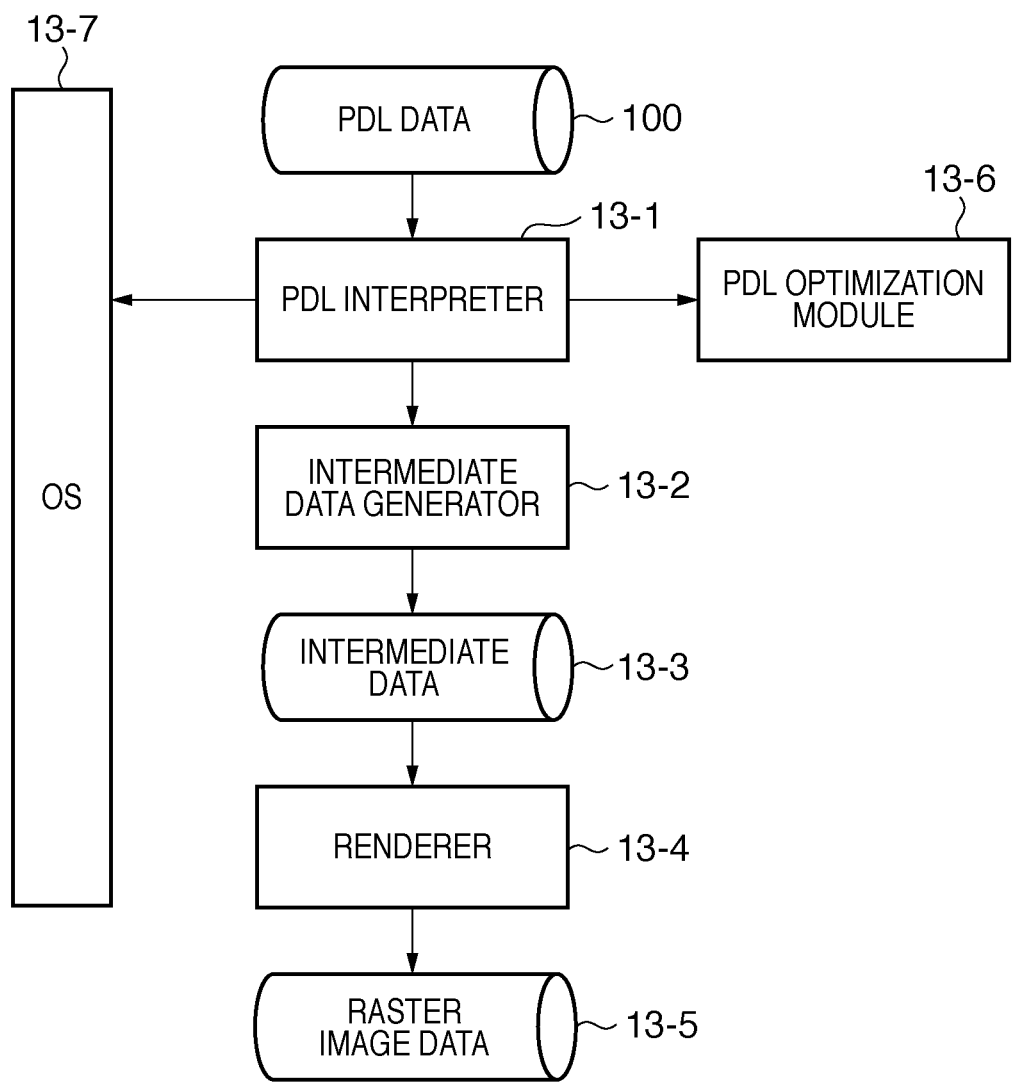

F I G. 14

| TYPE OF RENDERING COMMAND | VALUE REPRESENTING TYPE OF RENDERING COMMAND | COST OF DL GENERATION PROCESSING |
|---|---|---|
| PROCESS ASSOCIATED WITH COMPRESSED DATA | 1 | 4 |
| SHADING RENDERING COMMAND PROCESS | 2 | 10 |
| TILE RENDERING COMMAND PROCESS | 3 | 3 |
| PATH RENDERING COMMAND PROCESS | 4 | 1 |
| COLOR CONVERSION PROCESS | 5 | 2 |
| FONT RENDERING COMMAND PROCESS | 6 | 2 |
| BITMAP RENDERING COMMAND PROCESS | 7 | 5 |
| EDGE RENDERING COMMAND PROCESS | 8 | 3 |
| OTHER / UNKNOWN | 0 | 0 |

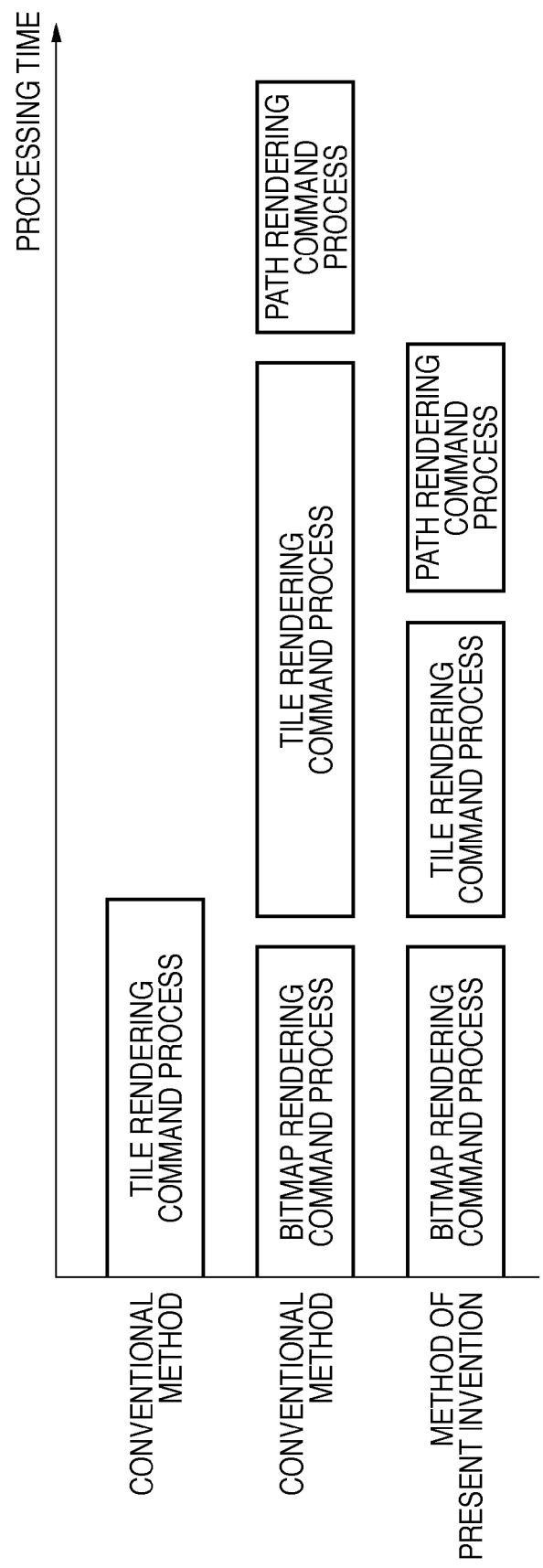

IMAGE FORMING APPARATUS, CONTROL METHOD AND COMPUTER-READABLE MEDIUM

BACKGROUND OF THE INVENTION

1. Field of the Invention

The present invention relates to an image forming apparatus, control method processing, and a computer-readable medium, called PDL processing and rendering processing and, more particularly, to accelerating processing of PDL processing, intermediate data generation processing, and rendering processing required in an image forming apparatus represented by a printer or multi-function peripheral having a plurality of processors.

2. Description of the Related Art

Conventionally, processing associated with rendering executed in an image forming apparatus allows to form an image when a plurality of processors share processes associated with image formation.

Also, a conventional accelerating technology associated with image forming processing implements accelerating processing by sharing processes among different devices. For example, "Canon technology UFR/LIPS V" (URL: http://web.canon.jp/technology/canon_tech/explanation/h_speed_processing.html) discloses a accelerating technology associated with processes between an information processing apparatus (PC) and image forming apparatus (multi-function peripheral: MFP). A feature of image forming processing based on this technology lies in that the information processing apparatus and image forming apparatus share processing loads associated with image formation. That is, the processing costs of the processes including page layout processing, graphics processing, and image processing are optimized between the information processing apparatus and image forming apparatus, thus shortening a time required from a print processing start instruction from the information processing apparatus until actual print processing executed by a print engine.

Another technology of accelerating the image forming processing implements accelerating processing using a plurality of processors included in an image forming apparatus. For example, Japanese Patent Laid-Open No. 10-307924 describes a technology which attains high-speed processing by sharing processes by three processors including two CPUs and a "rendering engine" that implements rendering, and executing parallel processes for data in large quantities. Image forming processing according to this technology attains high-speed image formation by connecting a plurality of processors which can implement different processes, dividing processes associated with image formation, and executing the divided processes associated with image formation in the respective processors.

As described above, in the related art, a plurality of different processes are executed using a plurality of different processors, thus accelerating the processing associated with image formation.

However, in the related art, PDL interpretation processing (in other words, a PDL interpreter) associated with image forming processing generates intermediate data by interpreting PDL data based on that PDL data. Then, rendering processing (in other words, a renderer) generates raster image data by executing rendering processing based on the generated intermediate data. A problem of a processing speed drop is posed, as a result of carrying on the processes independently of whether or not the process in execution lowers the processing speed of the next step in the above respective processing steps. More specifically, upon reception of intermediate data having overlapping rendering commands in large quantities and rendering commands having large quantities of depth information, the processing speed of the rendering processing based on the related art is considerably reduced due to complexities of the depth information and overlapping information included in the intermediate data. The related art executes the PDL interpretation processing irrespective of whether or not to reduce the processing speed of the renderer is considerably. That is, the PDL interpreter carries on the PDL interpretation processing even when addition of intermediate data generated as a result of interpretation of PDL data during interpretation to the already generated intermediate data considerably reduces the speed of the rendering processing.

Hence, the related art does not check, during processing associated with image formation, whether or not addition of intermediate data generated based on PDL data during interpretation to the already generated intermediate data considerably reduces the speed of the rendering processing depending on their features. Since the related art does not include the above checking process, it is impossible to execute optimization processing during PDL interpretation in advance so as to accelerating the rendering processing during processing associated with image formation.

SUMMARY OF THE INVENTION

According to one aspect of the present invention, there is provided an image forming apparatus including a plurality of processors which perform interpretation processing of rendering commands and image forming processing, comprising: an accelerating processing determination unit which determines a process that allows accelerating processing, which is defined in advance, of processes included in the rendering commands; a processing cost determination unit which compares a processing cost calculated when the accelerating processing defined for each type of process is applied to the process which is determined by the accelerating processing determination unit to allow the accelerating processing with a processing cost calculated when the accelerating processing is not applied, and determines whether or not to apply the accelerating processing; a processing unit generation determination unit which determines based on the determination result of the processing cost determination unit whether or not to generate a new processing unit required for the plurality of processors to process the process determined to allow the accelerating processing; a generation unit which generates the process determined to allow the accelerating processing, in the new processing unit based on the determination result of the processing unit generation determination unit; and an accelerating processing execution unit which controls the plurality of processors to execute the process in the new processing unit generated by the generation unit, wherein the accelerating processing execution unit controls the processor different from the processor which performs the image forming processing to execute at least a part of the new processing unit.

According to another aspect of the present invention, there is provided a method of controlling an image forming apparatus including a plurality of processors which perform interpretation processing of rendering commands and image forming processing, comprising: an accelerating processing determination step of controlling a accelerating processing determination unit of the image forming apparatus to determine a process that allows accelerating processing, which is defined in advance, of processes included in the rendering commands; a processing cost determination step of controlling a processing cost determination unit of the image forming apparatus to compare a processing cost calculated when the accelerating processing defined for each type of process is applied to the process which is determined in the accelerating processing determination step to allow the accelerating processing with a processing cost calculated when the accelerating processing is not applied, and to determine whether or not to apply the accelerating processing; a processing unit generation determination step of controlling a processing unit generation determination unit of the image forming apparatus to determine based on the determination result in the processing cost determination step whether or not to generate a new processing unit required for the plurality of processors to process the process determined to allow the accelerating processing; a generation step of controlling a generation unit of the image forming apparatus to generate the process determined to allow the accelerating processing in the new processing unit based on the determination result in the processing unit generation determination step; and an accelerating processing execution step of controlling an accelerating processing execution unit of the image forming apparatus to control the plurality of processors to execute the process in the new processing unit generated in the generation step, wherein in the accelerating processing execution step, the processor different from the processor which performs the image forming processing is controlled to execute at least a part of the new processing unit.

According to the present invention, the rendering processing can be accelerated during processing associated with image formation by optimizing rendering processing in advance during PDL data interpretation.

Further features of the present invention will become apparent from the following description of exemplary embodiments (with reference to the attached drawings).

BRIEF DESCRIPTION OF THE DRAWINGS

FIG. 7 is a block diagram showing the relationship among software modules according to the embodiment;

FIG. 14 is a table showing intermediate data generation costs of rendering commands according to the embodiment; and FIG. 15 is a chart for explaining elapses of processing times of respective processes according to the embodiment.

DESCRIPTION OF THE EMBODIMENTS

First Embodiment

An embodiment of the present invention will be described hereinafter with reference to the drawings. Note that the present specification will refer to processing in which a PDL interpreter acquires PDL data and interprets the PDL data as PDL interpretation processing or PDL processing. Also, the present specification will refer to processing in which an intermediate data generator generates intermediate data based on the interpretation result of the PDL data, and a renderer generates raster image data based on this intermediate data as rendering processing.

[Processing Associated with Image Formation]

Figure 1:
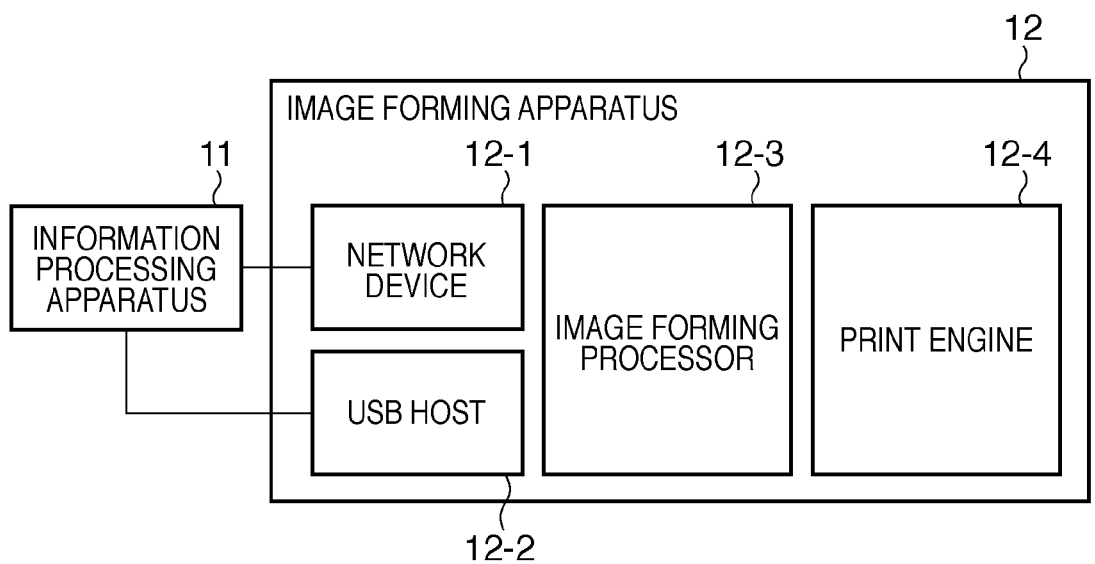
FIG. 1 is a block diagram for explaining an information processing apparatus and image forming apparatus according to an embodiment of the present invention.

FIG. 1 is a block diagram showing the arrangement of an image forming apparatus 12 according to the first embodiment of the present invention, and an information processing apparatus 11 connected to the image forming apparatus 12. The information processing apparatus 11 corresponds to a personal computer (PC), workstation, or the like. The information processing apparatus 11 can generate PDL data 100 on the self apparatus. Furthermore, the information processing apparatus 11 can transfer data including the PDL data 100 to an apparatus outside the information processing apparatus 11 via a network or an interface represented by USB. The image forming apparatus 12 is called a printer, multi-function peripheral, or the like, and can form a visible image on a medium represented by a paper sheet based on data represented by the PDL data 100.

Figure 2A:
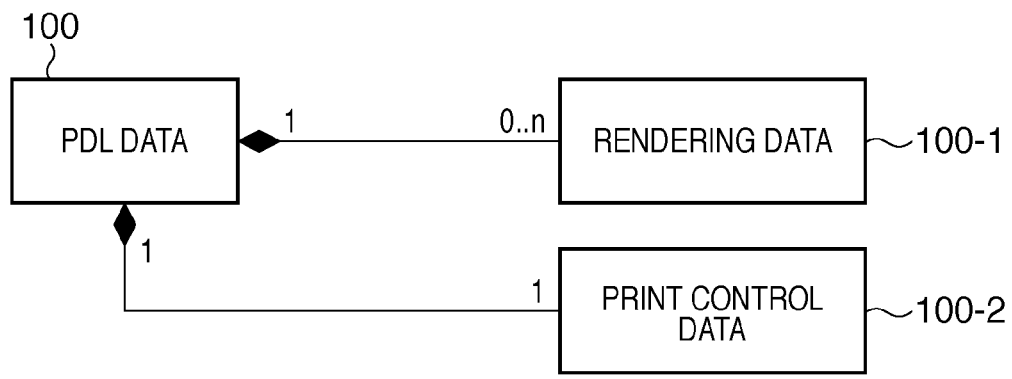
FIGS. 2A and 2B are views for explaining PDL data and intermediate data in the embodiment.
Figure 2B:
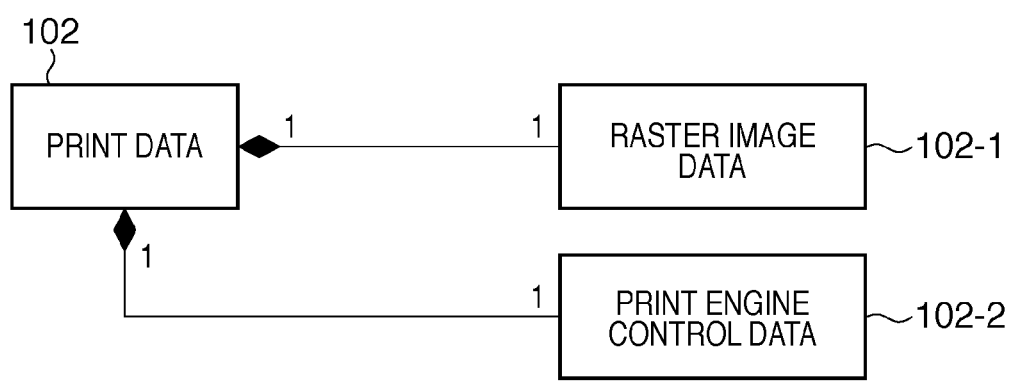

In FIGS. 2A and 2B, FIG. 2A is a view for explaining the PDL data 100, and FIG. 2B is a view for explaining print data 102. The PDL data 100 includes rendering data 100-1 and print control data 100-2. The rendering data 100-1 includes zero or more pieces of visible information to be formed by the image forming apparatus. The print control data 100-2 includes pieces of information associated with a paper size, imposition processing, color conversion processing, and the like.

Figure 3:
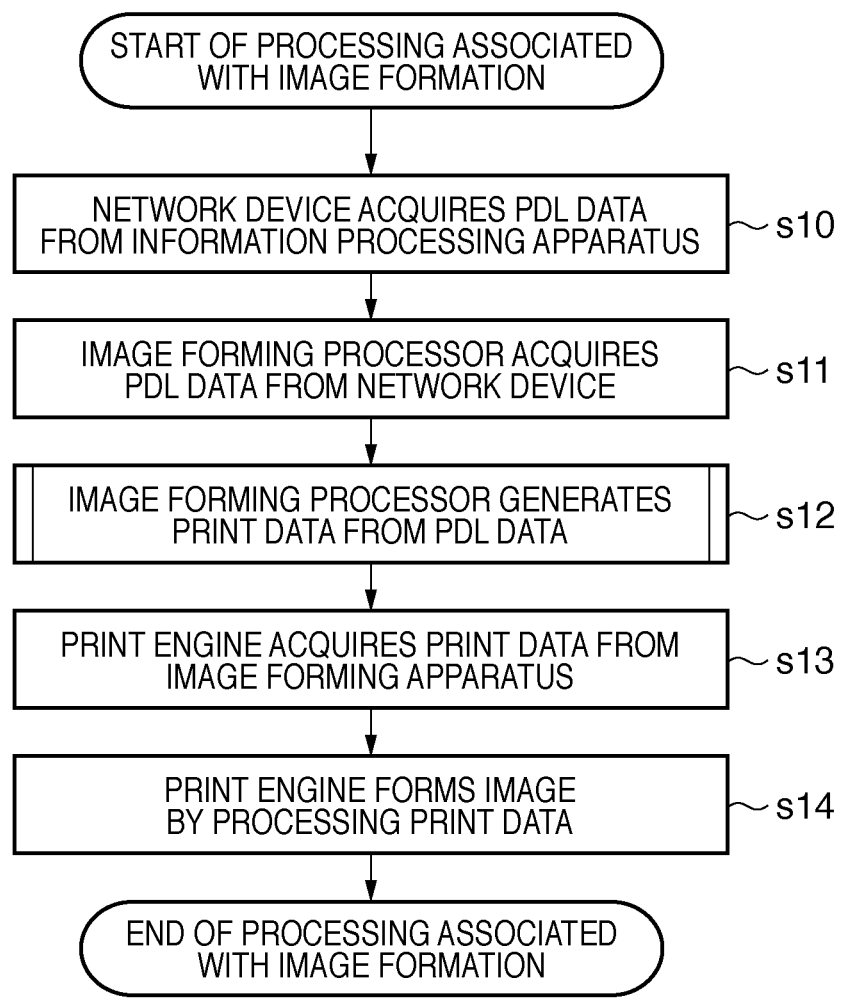
FIG. 3 is a flowchart for explaining the sequence of processing associated with image formation according to the embodiment.

The processing associated with image formation that allows the image forming apparatus 12 to form a visible image on a medium such as a paper sheet will be described below. FIG. 3 is a flowchart of the processing associated with image formation to be executed by the image forming apparatus 12. In step s10, a network device 12-1 acquires PDL data from the information processing apparatus 11. The network device 12-1 can acquire data including the PDL data by communicating with another apparatus by a technology represented by IEEE802.3. The present invention can also be practiced when the process in step s10 acquires data including the PDL data by communicating with another apparatus using a USB host 12-2. This USB host can communicate with another apparatus by a technology represented by USB2.0. In addition, the present invention can be practiced when data including the PDL data is acquired by connecting the image forming apparatus 12 to another apparatus via an interface compliant with IEEE1394a, RS-232C, or IEEE1284. The PDL data, which is acquired by the image forming apparatus 12 from another apparatus represented by the information processing apparatus 11 by the aforementioned technologies, is received by an image forming processor 12-3 in the image forming apparatus (s11). The image forming processor 12-3 generates print data based on this PDL data.

In step s11, the image forming processor 12-3 acquires the PDL data 100. In step s12, the image forming processor 12-3 generates the print data 102 based on the acquired PDL data. In step s14, a print engine 12-4 acquires this print data 102. As shown in FIG. 2B, the print data 102 includes raster image data and print engine control data. The print engine performs image formation based on the acquired print data 102, thus forming a visible image on a medium such as a paper sheet.

[Processing in Image Forming Processor]

Figure 4:
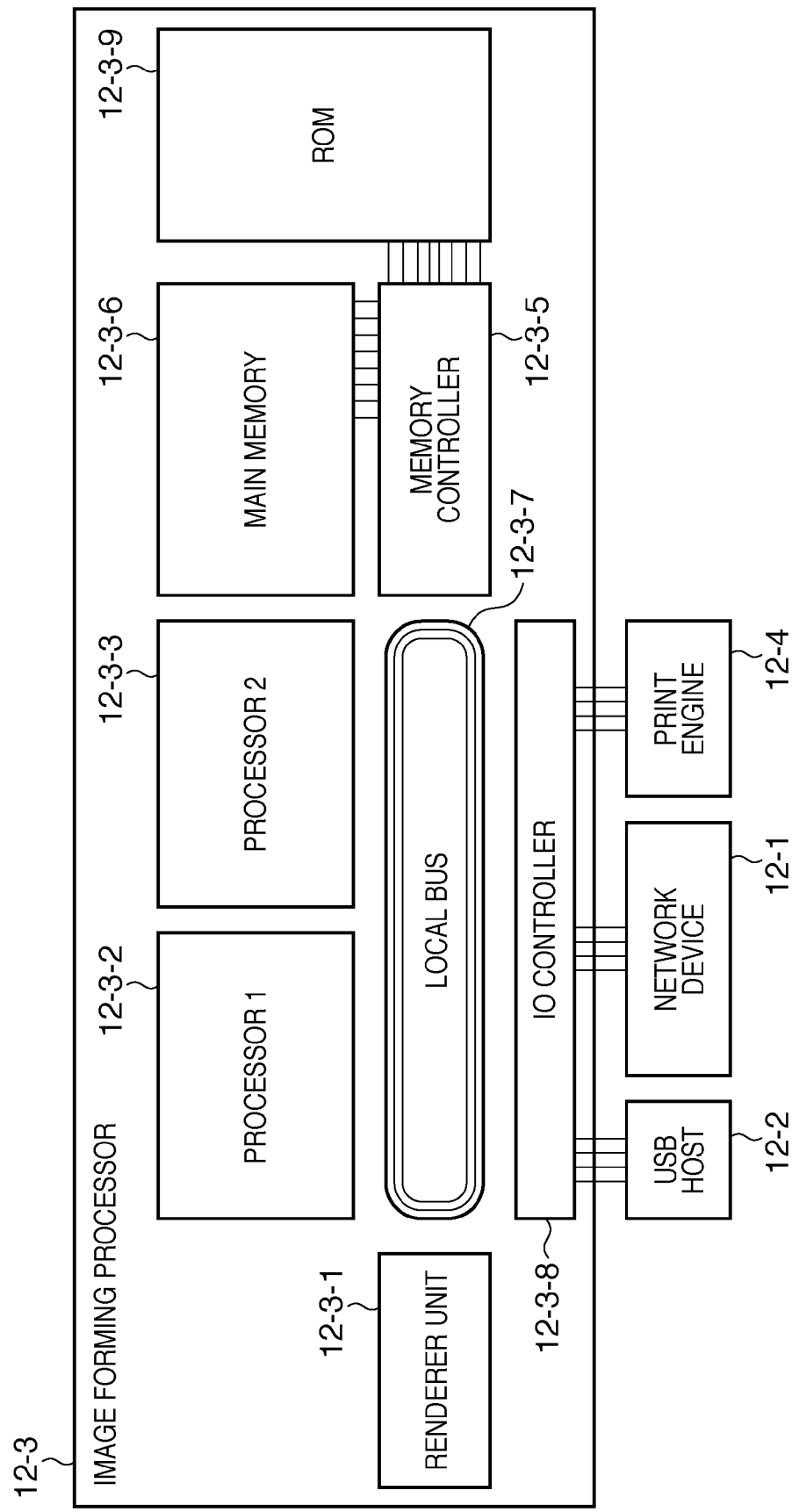
FIG. 4 is a block diagram for explaining the image forming apparatus according to the embodiment.

Of the image formation, the process shown in step s12 in FIG. 3 executed inside the aforementioned image forming processor 12-3 will be described in more detail below. FIG. 4 shows an example of the arrangement of the image forming processor 12-3 included in the image forming apparatus 12. The image forming processor 12-3 includes a renderer unit 12-3-1 as a general-purpose processor represented by a CPU. The renderer unit 12-3-1 acquires intermediate data, and generates raster image data. Processors 12-3-2 and 12-3-3 execute PDL interpretation processing and intermediate data generation processing. These processors 12-3-2 and 12-3-3 have functions as processing units, and correspond to, for example, CPUs. Note that the image forming processor 12-3 in this embodiment includes the two processors 12-3-2 and 12-3-3. However, the present invention is not limited to this, and can be practiced when the image forming processor 12-3 includes a plurality of (two or more) processors. In this embodiment, the image forming processor 12-3 includes only one renderer unit 12-3-1. However, the present invention is not limited to this, and can be practiced when the image forming processor 12-3 includes at least one renderer unit. In this embodiment, the renderer unit 12-3-1 acquires intermediate data and generates raster image data. However, the present invention can be practiced independently of processes shared by the processor 12-3-2 or 12-3-3. Also, the present invention can be practiced when the renderer unit 12-3-1 uses an information processing device other than a CPU such as an ASIC, DSP, or DRP.

A memory controller 12-3-5 serves as an interface with a main memory 12-3-6 and ROM 12-3-9. That is, the memory controller 12-3-5 allows to read and write data from and in the main memory 12-3-6. Also, the memory controller 12-3-5 allows to read data from the ROM 12-3-9. An IO controller 12-3-8 serves as an interface with an apparatus outside the image forming processor 12-3. That is, the IO controller 12-3-8 allows to exchange data with an apparatus outside the image forming processor 12-3. A local bus 12-3-7 connects the renderer unit 12-3-1, processors 12-3-2 and 12-3-3, memory controller 12-3-5, and IO controller 12-3-8. That is, the local bus 12-3-7 allows these connected devices to exchange data. In this embodiment, with the aforementioned arrangement, the image forming processor 12-3 generates print data based on the PDL data 100.

Figure 5:
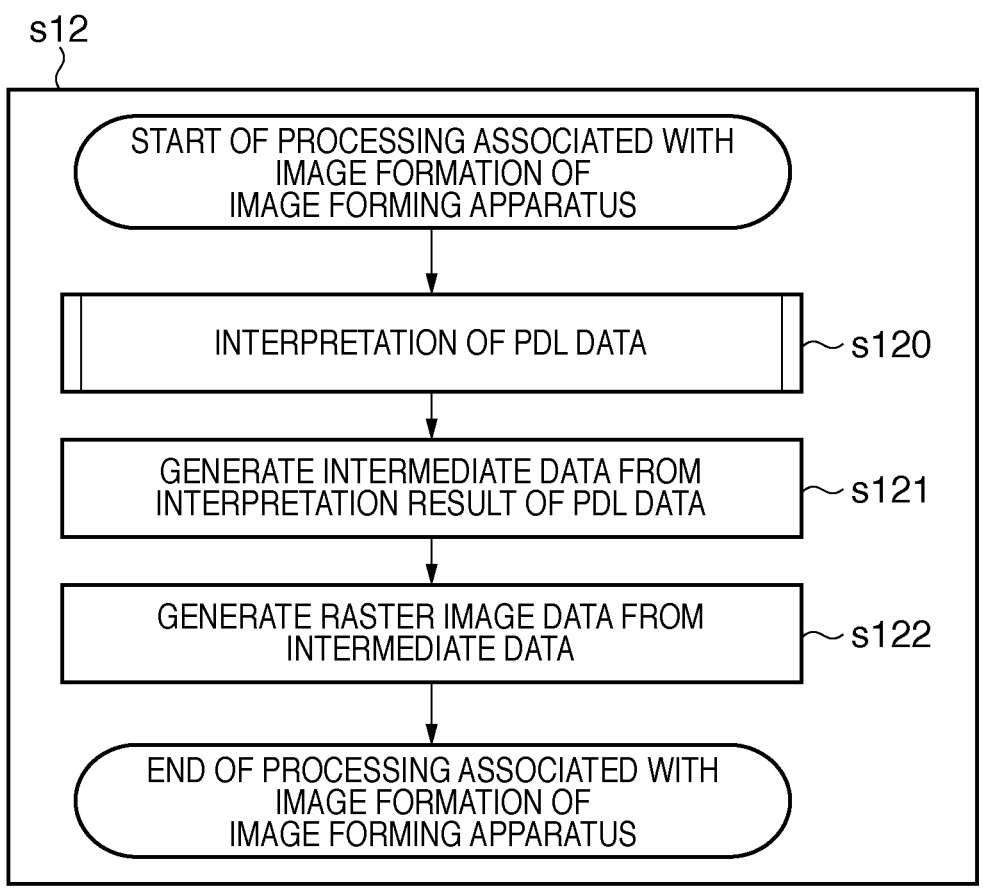
FIG. 5 is a flowchart for explaining the sequence from PDL interpretation processing until rendering processing according to the embodiment.

Processing steps associated with this print data generation will be described below with reference to FIG. 5. The processor 12-3-2 or 12-3-3 of the image forming processor 12-3 executes interpretation processing of the PDL data 100 (s120). The processor 12-3-2 or 12-3-3 generates intermediate data from the interpretation result of the PDL data 100 (s121). The renderer unit 12-3-1 then generates raster image data 13-5 based on this intermediate data.

Note that this PDL data 100 includes a plurality of types. For example, Adobe PDF and PostScript of Adobe Systems, Incorporated, LIPS of Canon Inc., and the like are known. A PDL interpreter 13-1 and intermediate data generator 13-2 which run on the processor 12-3-2 or 12-3-3 generate intermediate data 13-3 having a common data format that can be interpreted by the renderer from the PDL data 100 for which these different formats are available. Based on this intermediate data 13-3, a renderer 13-4 generates the raster image data 13-5 using the renderer unit 12-3-1 (s122).

FIG. 7 shows the relationship among software modules in the embodiment of the present invention in correspondence with the aforementioned overview of the sequence.

[Accelerating Processing in PDL Data Interpretation Processing]

Figure 6:
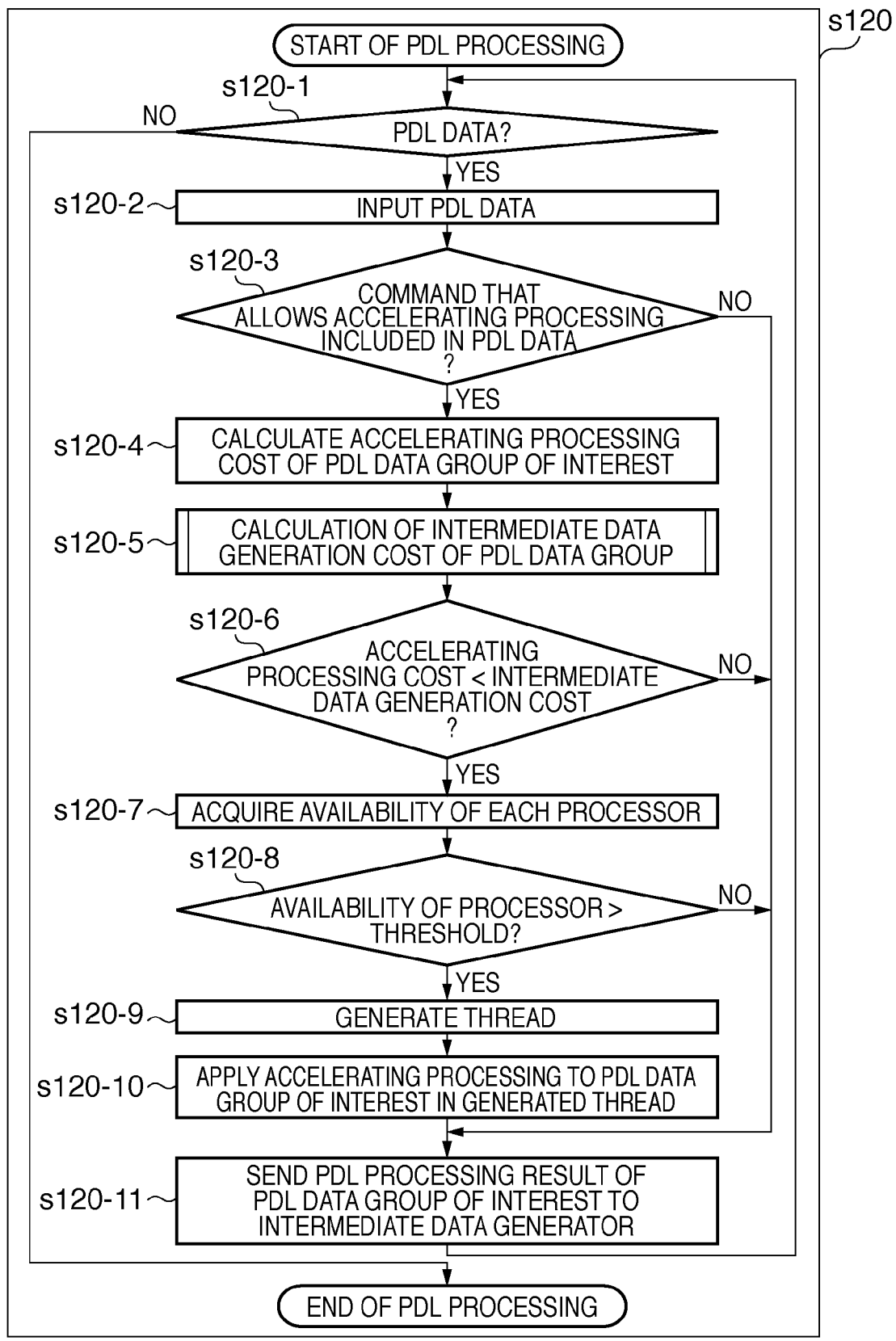
FIG. 6 is a flowchart for explaining the sequence of accelerating processing by a PDL interpreter according to the embodiment.

The PDL data interpretation processing (s120) shown in FIG. 5 will be described below with reference to FIG. 6. The PDL interpreter determines whether or not at least a part of PDL data 100 that can be input is available (s120-1). If no PDL data 100 is available, the PDL processing ends. If at least a part of the PDL data 100 is available, the PDL interpreter inputs the PDL data (s120-2). The PDL interpreter determines whether or not the input PDL data includes a process that allows accelerating processing (s120-3). This implements an accelerating processing determination unit. In this embodiment, the processes that allow the accelerating processing include:

process associated with compressed data
shading rendering command process
tile rendering command process
path rendering command process
color conversion process
font rendering command process
bitmap rendering command process
edge rendering command process However, the present invention is not limited to these processes, and the processes to which the present invention is applicable include those to be executed by the PDL interpreter in addition to the above processes. Note that in this embodiment, a cost required to generate intermediate data by applying the accelerating processing to various processes will be referred to as an accelerating processing cost, and a cost required to generate intermediate data without applying the accelerating processing will be referred to as an intermediate data generation cost. Also, in this embodiment, costs with and without application of the accelerating processing are compared, and whether or not to apply the accelerating processing is determined based on their difference. This processing cost determination unit will be described in detail below.

If PDL data includes a command that allows the accelerating processing, the process advances to step s120-4. If the PDL data includes a command that does not allow the accelerating processing, the process jumps to step s120-11. Next, the PDL interpreter calculates an accelerating processing cost of a PDL data group of interest (step s120-4). More detailed cost calculation methods of the respective processes will be described later in the next section.

The PDL interpreter then calculates an intermediate data generation cost of the PDL data group of interest (s120-5). The PDL interpreter compares the accelerating processing cost and intermediate data generation cost (s120-6). As a result of comparison, if the intermediate data generation cost is larger than the accelerating processing cost, the process advances to step s120-7. Conversely, if the intermediate data generation cost is equal to or smaller than the accelerating processing cost, the process jumps to step s120-11. If the accelerating processing cost is larger, this indicates that the processing of the PDL data of interest is suitably continued without applying the accelerating processing. If the intermediate data generation cost is larger, this indicates that the processing of the PDL data of interest is suitably executed by applying the accelerating processing.

Next, the PDL interpreter 13-1 inquires the processors 12-3-2 and 12-3-3 about their availability (occupation rates) (s120-7). The PDL interpreter then compares the acquired availability of the processors with a threshold which is defined in advance (s120-8). If the availability exceeds the threshold, the process advances to step s120-9. If the availability does not exceed the threshold, the process jumps to step s120-11. The PDL interpreter then generates a thread required for the accelerating processing (s120-9). The PDL interpreter applies the accelerating processing to the PDL data of interest to be accelerated in the generated thread (s120-10). After that, the PDL interpreter sends its processing result to the intermediate data generator (s120-11). The process then returns to step s120-1 to repeat the aforementioned processes.

[Method of Calculating Accelerating Processing Cost of PDL Data Group of Interest]

The method that allows the PDL interpreter 13-1 to calculate the accelerating processing cost to be compared with the intermediate data generation cost in step s120-6 will be described below. An embodiment of the method that allows the PDL interpreter 13-1 to calculate the accelerating processing cost of the PDL data group of interest (s120-4) will be explained. That is, this implements a function of an accelerating processing cost determination unit.

When the PDL data 100 includes a command that allows the accelerating processing (s120-3), the PDL interpreter 13-1 calculates the accelerating processing cost (s120-4). In this embodiment, the following commands are accelerating processing targets.

process associated with compressed data
    shading rendering command process
    tile rendering command process
    path rendering command process
    color conversion process
    font rendering command process
    bitmap rendering command process
    edge rendering command process In this embodiment, the accelerating processing costs are calculated for the respective processes by the following methods (calculation formulas).

<Process Associated with Compressed Data>

Let $C_{cmp}$ be a cost required for the accelerating processing of compressed data, cmp_size be a size of the compressed data, weight[cmp_type] be a weighting parameter (load parameter) of a cost corresponding to a compression technology cmp_type of the compressed data, and cmp_init be an initial cost required for the accelerating processing of the compressed data process. Then, an accelerating processing cost of the compressed data process can be calculated by:

$$C_{cmp} = \text{cmp\_size} \times \text{weight}[\text{cmp\_type}] + \text{cmp\_init}$$

Assume that the weighting parameter corresponding to each compression technology cmp_type of the compressed data is defined in advance.

<Shading Rendering Command Process>

Let $C_{shading}$ be a cost required for the accelerating processing of a shading rendering command, shading_size be a shading_size, weight[shading_type] be a weighting parameter of a cost corresponding to a shading type shading_type, and shading_init be an initial cost required for the shading rendering command accelerating processing. Then, the PDL interpreter 13-1 can calculate an accelerating processing cost of the shading rendering command process:

$$C_{shading} = \text{shading\_size} \times \text{weight}[\text{shading\_type}] + \text{shading\_init}$$

Figure 8A:
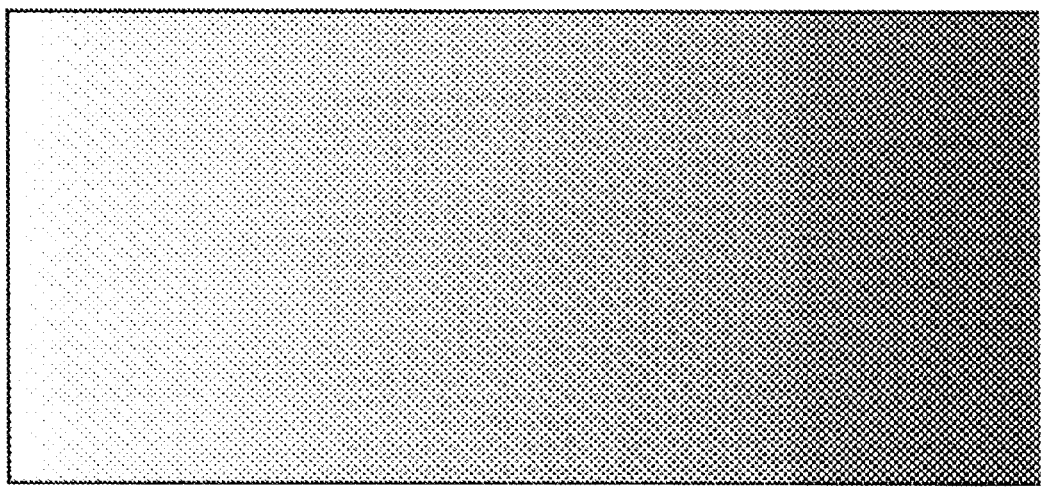
FIGS. 8A and 8B are views for explaining linear and radial shadings.

Note that the shading type of the shading rendering command indicates a type of shading command, and includes, for example, the following types. As one of the shading types, linear shading is available. FIG. 8A shows an example of the rendering result by linear shading. As shown in FIG. 8A, a rendering area by linear shading is rendered based on color changes expressed by a linear calculation formula between two or more control points.

Figure 8B:
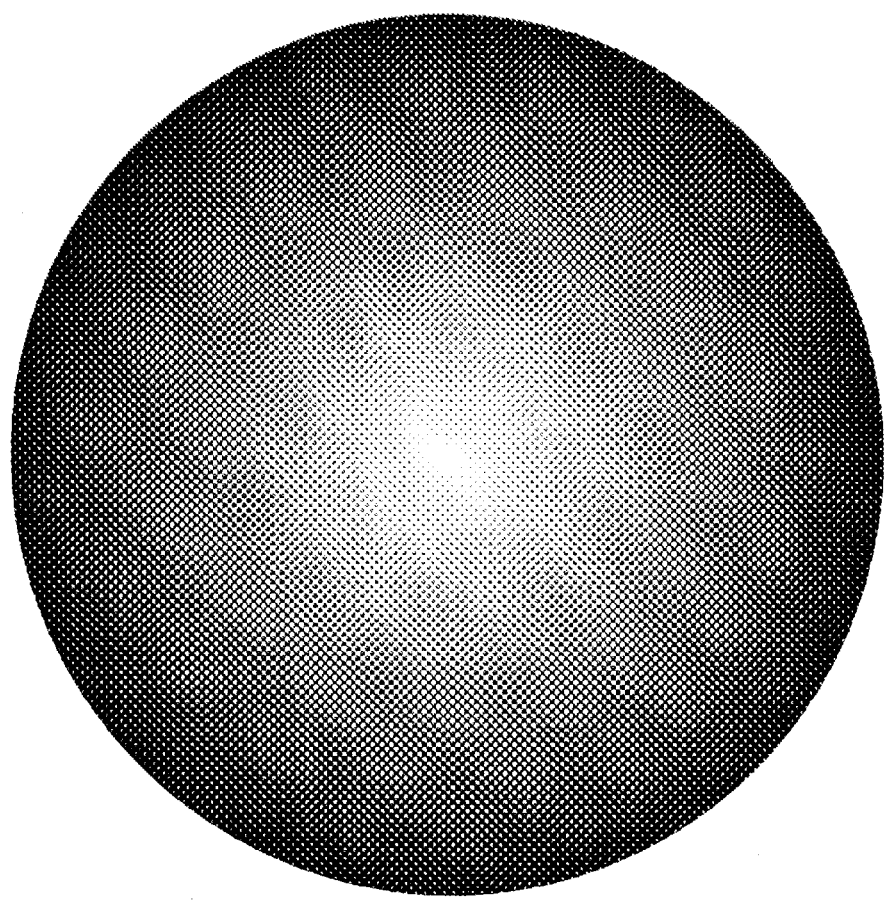

As one of other shading types, radial shading is available. FIG. 8B shows an example of the rendering result by radial shading. As shown in FIG. 8B, a rendering area by radial shading is rendered based on color changes expressed by a linear calculation formula between two or more circles or ovals.

<Tile Rendering Command Process>

Let $C_{tile}$ be a cost required for the accelerating processing of a tile rendering command, tile_weight be a weighting parameter of a processing cost of the tile rendering command, tile_area size be a size of an area to be rendered by the tile rendering command, tile_cell_size be a size of a cell in the tile rendering command, and tile_init be an initial cost required for the tile rendering command accelerating processing. Then, the PDL interpreter 13-1 can calculate an accelerating processing cost of the tile rendering command by:

$$C_{tile} = \text{tile\_weight} \times \frac{\text{tile\_area\_size}}{\text{tile\_cell\_size}} + \text{tile\_init}$$

Figure 9A:
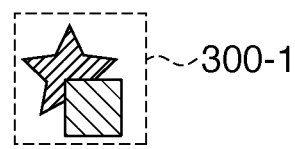
FIGS. 9A and 9B are views for explaining a pattern.
Figure 9B:
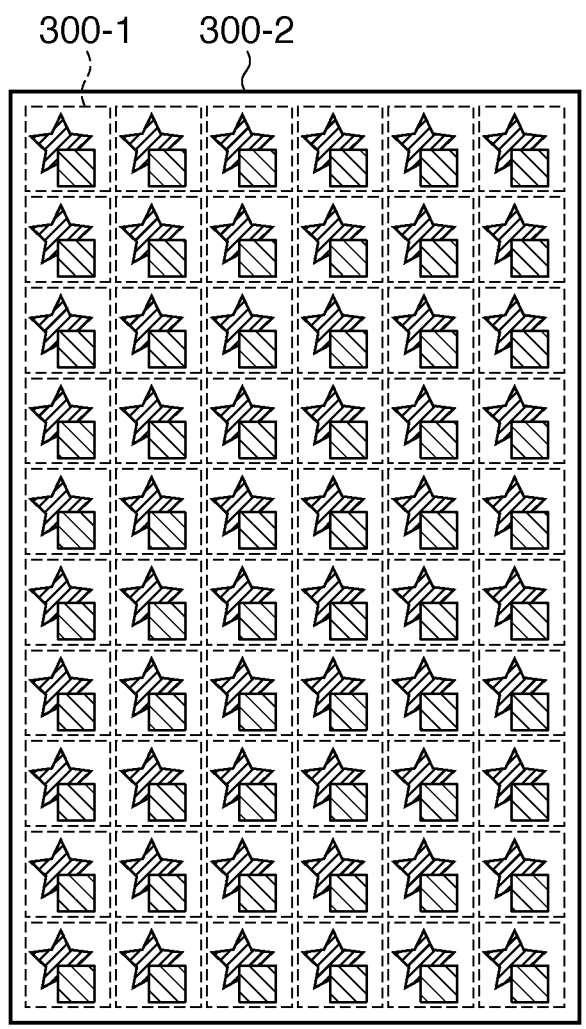

An area and cells of a tile to be rendered by the tile rendering command will be described below with reference to FIGS. 9A and 9B. The tile rendering command is a rendering command which repetitively renders a certain rendering command within a given rendering area. This rendering command to be repeated will be referred to as a cell 300-1 (see FIG. 9A). The renderer 13-4 repetitively renders the cell of the tile on an area 300-2 which is indicated in the tile rendering command and is to be rendered by the tile rendering command, thereby generating the tile rendering result shown in FIG. 9B.

<Path Rendering Command Process>

Let $C_{path}$ be a cost required for the accelerating processing of a path rendering command, path_weight be a weighting parameter of a processing cost of the path rendering command, path_size be the number of path point sequences to be rendered by the path rendering command, and path_init be an initial cost required for the path rendering command accelerating processing. Then, the PDL interpreter 13-1 can calculate an accelerating processing cost of the path rendering command by:

$$C_{path} = \text{path\_weight} \times \text{path\_size} + \text{path\_init}$$

<Color Conversion Process>

Let $C_{cms}$ be a cost required for accelerating processing of the color conversion process, cms_weight be a weighting parameter of a processing cost of the color conversion process, cms_size be the required number of colors to be converted, cms_type be a required type of color conversion process, cms_weight[cms_type] be an array of weighting parameters of processing corresponding to the required type cms_type of color conversion process, and cms_init be an initial cost required for the color conversion process accelerating processing. Then, the PDL interpreter 13-1 can calculate a cost required for the accelerating processing of the color conversion process by:

$$C_{cms} = \text{cms\_weight} \times \text{cms\_size} \times \text{cms\_weight}[\text{cms\_type}] + \text{cms\_init}$$

Note that the PDL interpreter 13-1 can calculate the required number of colors to be converted by the following method. For example, for a bitmap image, the PDL interpreter 13-1 can calculate the required number of colors to be converted from the number of pixels. Also, for example, for a rendering command that paints the interior of a closed space expressed by path point sequences in one color, the PDL interpreter 13-1 can decide that the required number of colors to be converted is "1".

<Font Rendering Command Process>

Let $C_{font}$ be a cost required for the accelerating processing of the font rendering command process, font_weight be a weighting parameter of a processing cost of the font rendering command, font_max be the number of types of font sizes included in the font rendering command, font_size[i] be an array of character sizes of fonts which correspond to the number of types of font sizes and require rendering, font_num[i] be an array of the numbers of characters of fonts corresponding to the number of types of font sizes, and font_init be an initial cost required for the font rendering command accelerating processing. Then, the PDL interpreter 13-1 can calculate a cost required for the font rendering command accelerating processing by:

$$C_{font} = \text{font\_weight} \times \sum_{i=0}^{font\_max} \text{font\_size}[i] \times \text{font\_num}[i] + \text{font\_init}$$

Figure 10:
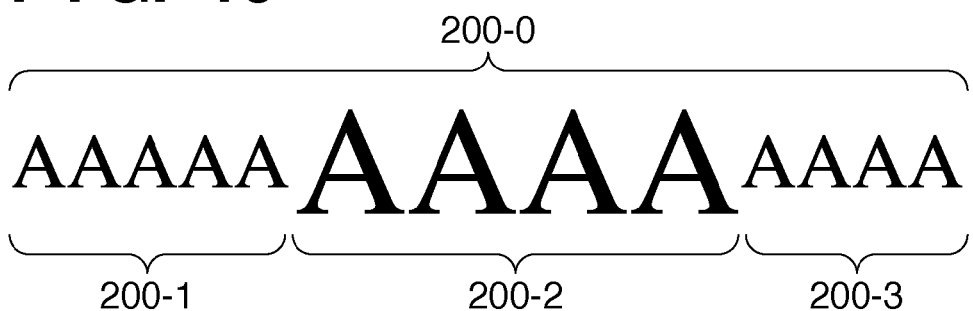
FIG. 10 is a view for explaining an example of a character rendering command.

Note that the font rendering command and values of the aforementioned font_max, font_size, and font_num will be described below taking FIG. 10 as an example. The font rendering command includes a plurality of character strings 200-0 to be rendered, as shown in FIG. 10. In this example, the font rendering command includes font rendering units 200-1, 200-2, and 200-3 which are classified into three units. The font rendering command includes a plurality of characters to be rendered for each font size. For example, the character set 200-1 having a font size=20 includes five characters. The character set 200-2 having a font size=30 includes four characters. Also, the character set 200-3 having a font size=19 includes four characters. That is, in case of FIG. 10, the number font_max of types of font sizes is assigned the following numerical value:

font_max=3.

Also, in case of FIG. 10, the array font_size of character sizes of fonts which correspond to the number of types of font sizes and require rendering has the following three numerical values:

font_size[0]=20
font_size[1]=30
font_size[2]=19

Furthermore, in case of FIG. 10, the array font_num of the numbers of characters of fonts corresponding to the number of types of font sizes has the following three numerical values:

font_num[0]=5
font_num[1]=4
font_num[2]=4

Based on the aforementioned values, the accelerating processing cost can be calculated.

<Bitmap Rendering Command Process>

Let $C_{bitmap}$ be a cost required for the accelerating processing of the bitmap rendering command process, bitmap_weight be a weighting parameter of a processing cost of the bitmap rendering command, bitmap_size be a size of a bitmap included in the bitmap rendering command, bitmap_channel be the number of colors (number of color channels) of the bitmap included in the bitmap rendering command, and bitmap_init be an initial cost required for the bitmap rendering command accelerating processing. Then, the PDL interpreter 13-1 can calculate a cost required for the bitmap rendering command accelerating processing by:

$$C_{bitmap} = \text{bitmap\_weight} \times \text{bitmap\_size} \times \text{bitmap\_channel} + \text{bitmap\_init}$$

Edge Rendering Command Process>

Let $C_{edge}$ be a cost required for the accelerating processing of the edge rendering command process, edge_size be an area size to be rendered by the edge rendering command, edge_channel be the number of colors in the edge rendering command process, edge_weight[edge_channel] be an array which associates the number edge_channel of colors (number of color channels) in the edge rendering command process and the weighting parameter of the processing cost with each other, and edge_init be an initial cost required for the edge rendering command accelerating processing. Then, the PDL interpreter 13-1 can calculate a cost required for the edge rendering command accelerating processing by:

$$C_{edge} = \text{edge\_size} \times \text{edge\_weight}[\text{edge\_channel}] + \text{edge\_init}$$

As described above, the accelerating processing costs in the respective target processes in this embodiment can be calculated.

[Method 1 of Calculating Intermediate Data Generation Cost of PDL Data Group of Interest]

The PDL interpreter 13-1 calculates the intermediate data generation cost to be compared with the accelerating processing cost in step s120-6. The method that allows the PDL interpreter 13-1 to calculate the intermediate data generation cost of the PDL data group of interest (s120-5) in this embodiment will be described below. That is, this implements an intermediate data generation cost determination unit.

Figure 13:
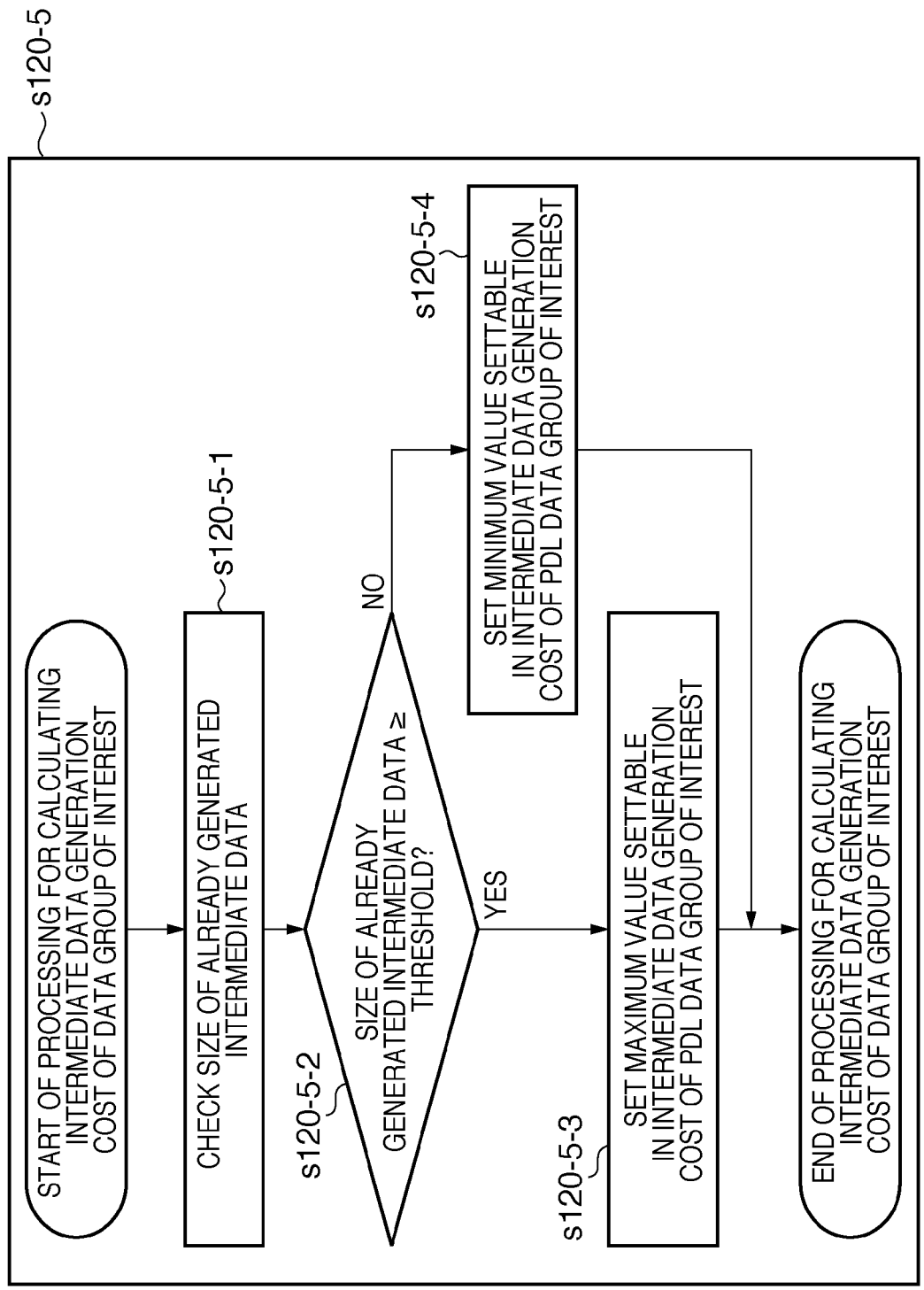
FIG. 13 is a flowchart of processing for calculating an intermediate data generation cost according to the embodiment.

FIG. 13 is a flowchart for explaining the processing sequence of the method of calculating the intermediate data generation cost of the PDL data group of interest (s120-5). In step s120-5-1, the PDL interpreter 13-1 acquires a size of intermediate data which has already been generated by the PDL interpreter 13-1 and intermediate data generator 13-2.

The PDL interpreter 13-1 checks in step s120-5-2 whether or not the acquired size of the intermediate data is equal to or larger than a threshold which is defined in advance. The threshold used in this checking process is defined depending on the processing performance of the corresponding image forming processor. For example, the threshold is defined depending on the capacity of the main memory 12-3-6. Alternatively, this embodiment can be practiced when the threshold is defined depending on the processing speeds of the processors 12-3-2 and 12-3-3. Furthermore, this embodiment can be practiced when the threshold is defined in consideration of both the capacity of the main memory 12-3-6 and the processing speeds of the processors 12-3-2 and 12-3-3.

If the checking result as to whether or not the size of the intermediate data is equal to or larger than the threshold is true, the PDL interpreter 13-1 advances to step s120-5-3. On the other hand, if the checking result as to whether or not the size of the intermediate data is equal to or larger than the threshold is false, the PDL interpreter 13-1 advances to step s120-5-4. The PDL interpreter 13-1 sets, based on the above checking result, a maximum value which can be set in a cost required for intermediate data generation in step s120-5-3. Note that the maximum value is, for example, as follows. That is, in case of the processors 12-3-2 and 12-3-3 which can handle 32-bit data, the PDL interpreter 13-1 allocates a memory having a 32-bit size in a variable for the cost required for intermediate data generation. Hence, the PDL interpreter 13-1 sets "2147483647" as the maximum value.

The PDL interpreter 13-1 sets, based on the above checking result, a minimum value which can be set in a cost required for intermediate data generation in step s120-5-4. Note that the minimum value is, for example, as follows. That is, in case of the processors 12-3-2 and 12-3-3 which can handle 32-bit data, the PDL interpreter 13-1 allocates a memory having a 32-bit size in a variable for the cost required for intermediate data generation. Hence, the PDL interpreter 13-1 sets "−2147483648" as the minimum value.

[Comparison Processing Between Accelerating Processing Cost and Intermediate Data Generation Cost]

Figure 11:
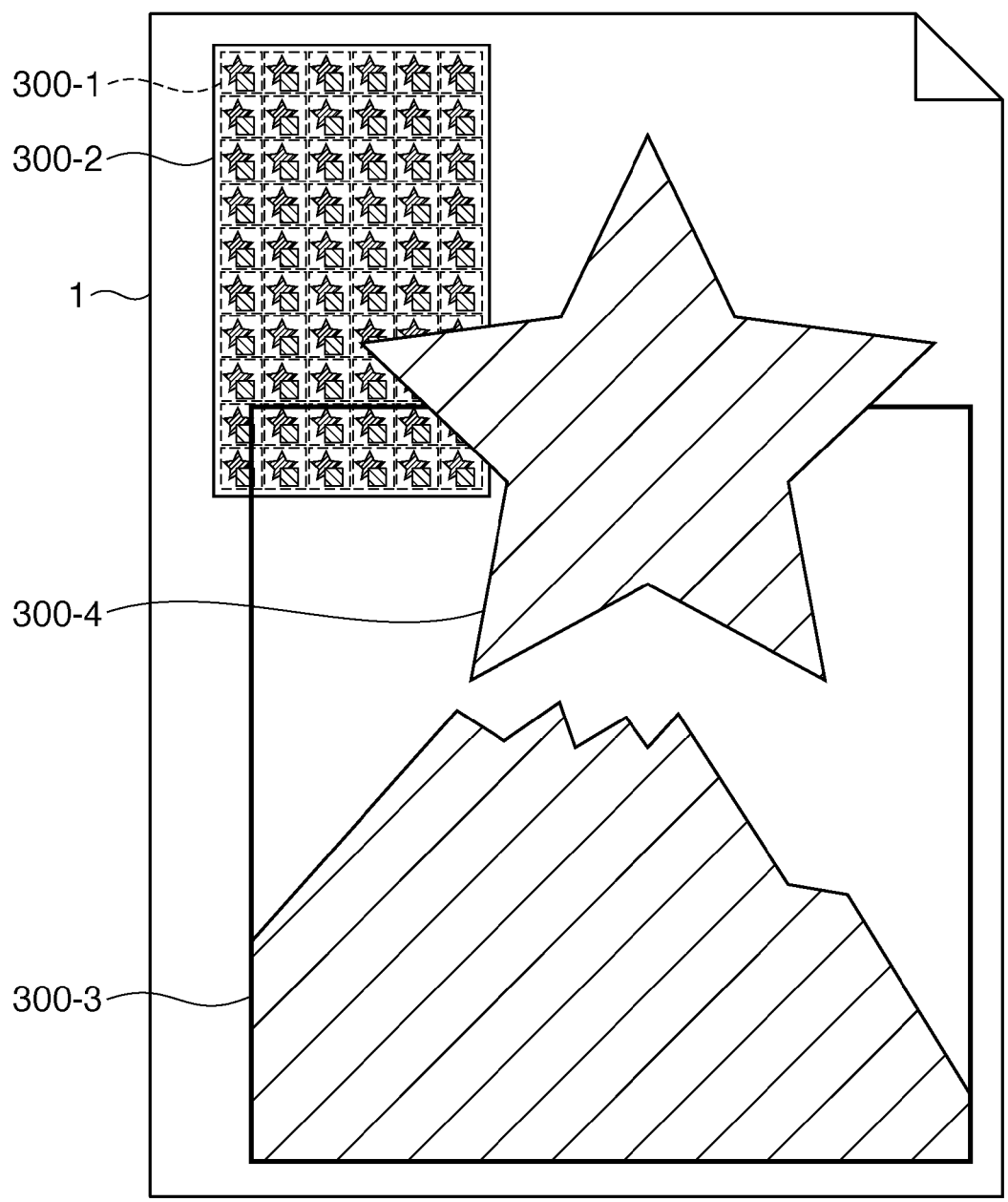
FIG. 11 is a view for explaining object rendering based on PDL data.
Figure 12:
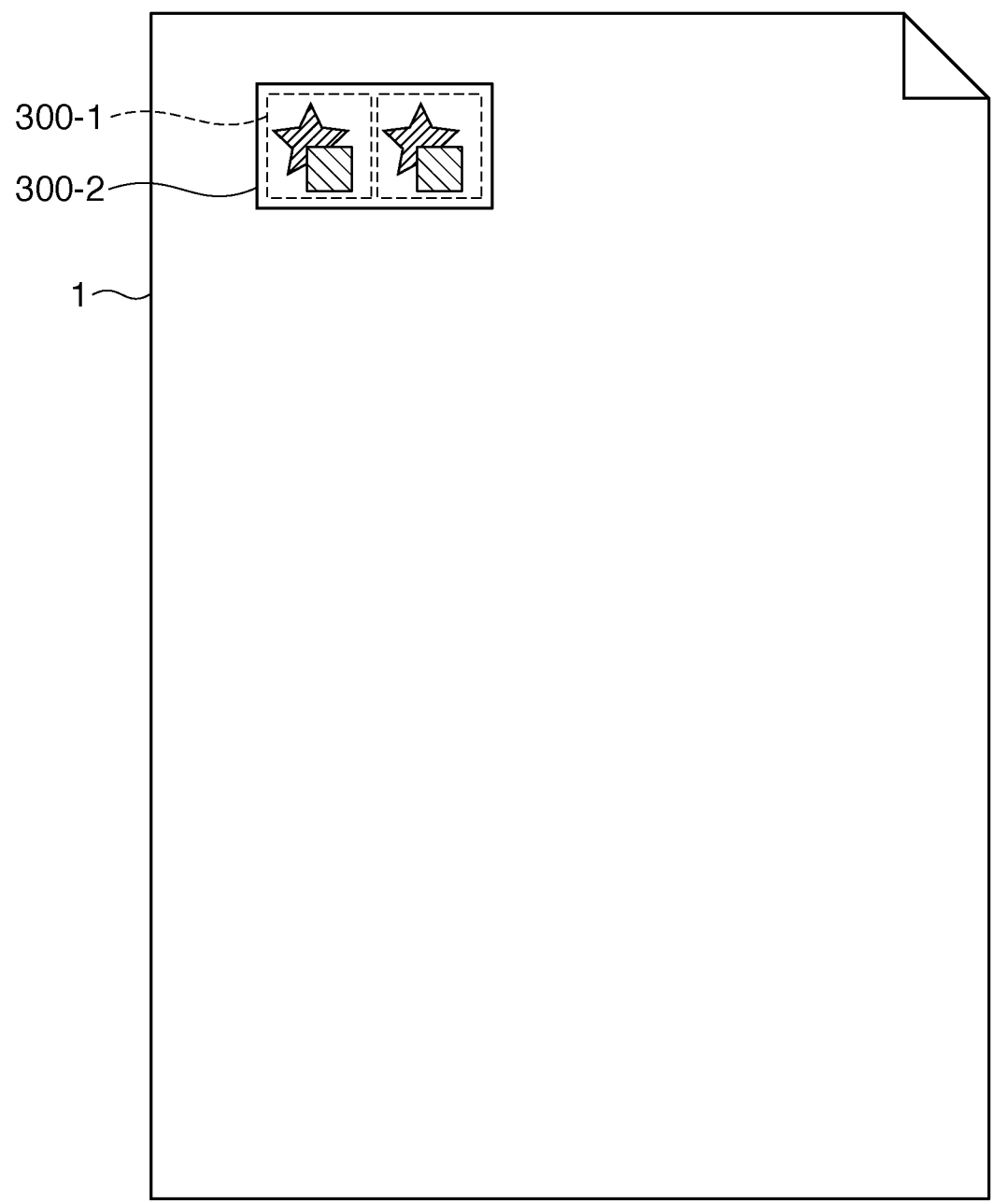
FIG. 12 is a view for explaining rendering of cells in a tile pattern.

The comparison processing between the accelerating processing cost and intermediate data generation cost (s120-6) will be described below using an example. FIG. 11 shows an example of an image to be rendered by the PDL data 100 including a tile rendering command and bitmap rendering command. That is, the image is rendered based on a bitmap rendering command in the PDL data by the PDL interpreter 13-1, an PDL optimization module 13-6, the intermediate data generator 13-2, and the renderer 13-4 (to render a bitmap 300-3). Next, the image is rendered based on a tile rendering command required to cover the area 300-2 with the cell 300-1 in the PDL data by the PDL interpreter 13-1, PDL optimization module 13-6, intermediate data generator 13-2, and renderer 13-4 (to render the cells 300-1 in the area 300-2). Next, the image is rendered based on a path rendering command in the PDL data by the PDL interpreter 13-1, PDL optimization module 13-6, intermediate data generator 13-2, and renderer 13-4 (to render a path 300-4). As a result, the rendering result shown in FIG. 11 is obtained.

The comparison processing of the intermediate data generation cost in this example of the PDL data 100 (s120-6) will be described below. Since the minimum value is set in the memory in step s120-5 executed before step s120-6 in the bitmap rendering command which is rendered first, the PDL interpreter 13-1 determines false in step s120-6. That is, the intermediate data generator 13-2 generates the intermediate data 13-3 without any accelerating processing by the PDL optimization module 13-6.

Since the maximum value is set in the memory in step s120-5 executed before step s120-6 in the next tile rendering command to be rendered, the PDL interpreter 13-1 determines true in step s120-6. Based on this determination result, the PDL interpreter 13-1 advances to step s120-7.

In this case, the PDL interpreter 13-1 acquires the availability of each of the processors 12-3-2 and 12-3-3. This availability can be calculated from the occupation rate of the processor obtained by using the function of, for example, an OS 13-7. This implements an occupation rate acquisition unit. That is, when the processors have already been heavily loaded by another process, they do not have any margin enough to start a new process for the accelerating processing. Therefore, the PDL interpreter can determine that the accelerating processing executed by the processors is to be skipped. Then, the PDL interpreter 13-1 compares the predetermined threshold with the occupation rate of the processor in step s120-8. As a result of this comparison, the PDL interpreter 13-1 can check whether or not to execute the accelerating processing. If the checking result is true, the PDL interpreter 13-1 generates or initializes a thread for the accelerating processing using the function of the OS 13-7 (s120-9). With this processing, a processing unit of the accelerating processing to be assigned to the processor can be generated. That is, this processing implements a processing unit generation determination unit.

Of course, this embodiment has explained the processing unit as a thread. Alternatively, this embodiment can be practiced when the new processing unit to be assigned is a process in place of the thread. Also, this embodiment can be practiced when the new processing unit to be assigned is a task in place of the thread. Furthermore, this embodiment can be practiced when the new processing unit to be assigned is a set of other routines and functions which can run parallelly in place of the thread.

The PDL interpreter 13-1 assigns the processes of the command group in the PDL data of interest to the assigned processing unit, thus executing the accelerating processing (s120-10). That is, the PDL interpreter 13-1 assigns the process associated with the tile rendering command to the generated processing unit. Then, this newly assigned processing unit executes the accelerating processing assigned by the PDL interpreter 13-1. Note that the accelerating processing will be described later in the next section. The PDL interpreter 13-1 then sends data to the intermediate data generator 13-2 based on the processing result of the new processing unit (s120-11), thus causing the intermediate data generator 13-2 to generate the intermediate data 13-3. The PDL interpreter 13-1 loads a command group of the next PDL data, and continues processing (s120-1).

[Accelerating Processing Executed by New Processing Unit]

The accelerating processing by the new processing unit generated by the PDL interpreter 13-1 will be described below (s120-10 in FIG. 6). Note that the target processes of the accelerating processing in this embodiment are the same as those for which the accelerating processing costs are calculated. This implements an accelerating processing execution unit. Note that the contents of the accelerating processing are different depending on processes included in PDL data such as load distribution and deletion of data to be processed, and they will be individually explained.

<Process Associated with Compressed Data>

The accelerating processing for the process associated with compressed data in this embodiment is, for example, as follows. That is, the new processing unit executes some or all of decompression processes of the compressed data. Thus, the load on the process associated with compressed data executed by the PDL interpreter 13-1 can be reduced.

<Shading Rendering Command Process>

The accelerating processing for the shading rendering command process in this embodiment is as follows. That is, shading processing to be executed by the renderer unit 12-3-1 is executed on the processor 12-3-2 or 12-3-3. Thus, intermediate data generation processing in the shading rendering command process is shared, thus reducing the load.

<Tile Rendering Command Process>

The accelerating processing for the tile rendering command process in this embodiment is, for example, as follows. That is, raster data generation processing in a cell associated with the tile rendering command to be executed by the renderer unit 12-3-1 is executed on the processor 12-3-2 or 12-3-3. Thus, intermediate data generation processing in the tile rendering command process is shared, thus reducing the load.

<Path Rendering Command Process>

The accelerating processing for the path rendering command process in this embodiment is, for example, as follows. That is, redundant points which are not required for rendering in the path point sequence are deleted. Also, when three points in the path point sequence are arranged in line, an intermediate point which is not required for rendering is deleted. Thus, the load on intermediate data generation processing in the path rendering command process can be reduced.

<Color Conversion Process>

The accelerating processing for the color conversion process in this embodiment is, for example, as follows. That is, the PDL interpreter 13-1 executes the color conversion process to be executed by the intermediate data generator 13-2. Thus, the load on intermediate data generation processing associated with the color conversion process can be reduced.

<Font Rendering Command Process>

The accelerating processing for the font rendering command process in this embodiment is, for example, as follows. That is, rendering commands including a continuous character string are combined into one edge rendering command. Thus, the load on intermediate data generation processing associated with the font rendering command process can be reduced.

<Bitmap Rendering Command Process>

The accelerating processing for the bitmap rendering command process in this embodiment is, for example, as follows. That is, resolution conversion of the bitmap rendering command process having information equal to or higher than a resolution required for image formation is executed. In this embodiment, image resolution conversion is executed based on a bicubic method. Of course, this embodiment can be practiced when the resolution conversion is implemented by a nearest neighbor method. Also, the present invention is not limited to such specific methods, and this embodiment can be practiced when the resolution conversion is implemented by a linear interpolation method or other methods. Thus, the load on intermediate data generation processing associated with the bitmap rendering command process can be reduced.

<Edge Rendering Command Process>

The accelerating processing for the edge rendering command process in this embodiment is, for example, as follows. Only points at two ends from the edge rendering command are handled, and the processing for other points is skipped. Thus, the load on intermediate data generation processing associated with the edge rendering command process can be reduced.

As described above, the different accelerating processing methods are applied depending on respective processes, thus generating intermediate data. Note that the accelerating processing methods for respective processes described above are examples. For example, as described in, for example, the bitmap rendering command process, the accelerating processing may be implemented by other methods.

Effect of First Embodiment

According to the present invention, the following effects are provided. That is, in general, when many processes have already been executed to consume many resources such as a memory in a computer, the processing speed is considerably lowered, or it becomes difficult to continue processing. Hence, the present invention focuses an attention on unique processing characteristics of various processes defined in PDL data, and executes accelerating processes in advance for respective different processing units, thereby reducing the load on the processing associated with intermediate data generation. Thus, the image forming processing can be accelerated. More specifically, in this embodiment, the PDL interpreter 13-1 compares costs required for the process to be applied (s120-6). That is, the PDL interpreter 13-1 compares a cost required when intermediate data is generated without the accelerating processing with a cost required when the intermediate data is generated by executing the accelerating processing. That is, it is checked whether or not the processing speed is lowered by the limitations of the image forming processor, when the PDL interpreter 13-1 and intermediate data generator 13-2 continue intermediate data generation processing for PDL data in the current state.

Note that the limitations include the above due to, for example, the memory capacity. If it is determined that the intermediate data generation cost is smaller when the accelerating processing is applied to the process in the PDL data, it is checked whether or not a new processing unit is to be temporarily generated prior to generation of intermediate data (s120-7, s120-8). In this case, the PDL interpreter 13-1 checks whether or not the processors have a margin enough to execute processing using the new processing unit (s120-8). If that checking result is true, the PDL interpreter 13-1 assigns the new processing unit to the processors to execute the process associated with a command group of interest in the PDL data (s120-9, s120-10).

With these processes described above, the PDL interpreter 13-1 focuses an attention on the processing characteristics unique to the PDL data, checks whether or not the process in execution lowers the processing speed of the next step, and then improves the processing speed based on the checking result. That is, as shown in FIG. 15, it is empirically demonstrated that the processing speed is improved. That is, unlike in a case in which only the tile rendering processing is executed by the conventional method, when intermediate data is generated by preceding rendering command processing, the processing speed of the next rendering command to be processed is considerably lowered. By contrast, the method according to this embodiment focuses an attention on the processing characteristics unique to the PDL data to prevent a considerable speed drop, thereby improving the processing speed.

As described above, in order to solve the problem that upon reception of intermediate data having overlapping rendering commands in large quantities and rendering commands having large quantities of depth information, the complexities of the depth information and overlapping information included in the intermediate data considerably reduce the processing speed, the present invention executes PDL interpretation processing while checking whether or not the processing speed of the renderer 13-4 is considerably reduced. That is, the PDL interpreter checks using the feature of already generated intermediate data, that of PDL data during interpretation, and occupation rate information of the plurality of processors whether or not to generate a new processing unit as processing to be executed by the processors. Based on the checking result, a condition that considerably reduces the processing speed is detected, and is optimized, thereby shortening the time required for the overall image forming processing.

Second Embodiment

In the first embodiment, an intermediate data generation cost of a PDL data group of interest is calculated. The second embodiment will explain another method of calculating an intermediate data generation cost.

[Method 2 of Calculating Intermediate Data Generation Cost of PDL Data Group of Interest]

A PDL interpreter 13-1 calculates an intermediate data generation cost to be compared with an accelerating processing cost in step s120-6. The method to be described in this embodiment is a method different from the first embodiment in the method of calculating an intermediate data generation cost of the PDL data group of interest by the PDL interpreter 13-1.

Let $C_{dl}$ be an intermediate data generation cost, dl_op_num be the number of rendering commands (number of processes) accumulated in intermediate data 13-3 generated by an intermediate data generator 13-2, and dl_weight be a weighting parameter of the intermediate data generation cost. Then, the PDL interpreter 13-1 can calculate and determine an intermediate data generation cost by:

$$C_{dl} = dl\_weight \times \log dl\_op\_num$$

As described above, in this embodiment as well, the same effects as in the first embodiment can be obtained.

Third Embodiment

In the first embodiment, an intermediate data generation cost of a PDL data group of interest is calculated. The third embodiment will explain still another method of calculating an intermediate data generation cost.

[Method 3 of Calculating Intermediate Data Generation Cost of PDL Data Group of Interest]

A PDL interpreter 13-1 calculates an intermediate data generation cost to be compared with an accelerating processing cost in step s120-6. The method to be described in this embodiment is a method different from the first embodiment in the method of calculating an intermediate data generation cost of the PDL data group of interest by the PDL interpreter 13-1.

Let $C_{dl}$ be an intermediate data generation cost, dl_op_num be the number of rendering commands (number of processes) accumulated in intermediate data 13-3 generated by an intermediate data generator 13-2, and dl_weight be a weighting parameter of the intermediate data generation cost. Then, the PDL interpreter 13-1 can calculate an intermediate data generation cost by:

$$C_{dl} = dl\_weight \times dl\_op\_num_n$$

As described above, in this embodiment as well, the same effects as in the first and second embodiments can be obtained.

Fourth Embodiment

In the first embodiment, an intermediate data generation cost of a PDL data group of interest is calculated. The fourth embodiment will explain still another method of calculating an intermediate data generation cost.

[Method 4 of Calculating Intermediate Data Generation Cost of PDL Data Group of Interest]

A PDL interpreter 13-1 calculates an intermediate data generation cost to be compared with an accelerating processing cost in step s120-6. The method to be described in this embodiment is a method different from the first embodiment in the method of calculating an intermediate data generation cost of the PDL data group of interest by the PDL interpreter 13-1.

Let $C_{dl}$ be an intermediate data generation cost, dl_op_num be the number of rendering commands (number of processes) accumulated in intermediate data 13-3 generated by an intermediate data generator 13-2, and dl_weight be a weighting parameter of the intermediate data generation cost. Then, the PDL interpreter 13-1 can calculate an intermediate data generation cost by:

$$C_{dl} = dl\_weight \times dl\_op\_num$$

As described above, in this embodiment as well, the same effects as in the first to third embodiments can be obtained.

Fifth Embodiment

In the first embodiment, an intermediate data generation cost of a PDL data group of interest is calculated. The fifth embodiment will explain still another method of calculating an intermediate data generation cost.

[Method 5 of Calculating Intermediate Data Generation Cost of PDL Data Group of Interest]

A PDL interpreter 13-1 calculates an intermediate data generation cost to be compared with an accelerating processing cost in step s120-6. The method to be described in this embodiment is a method different from the first embodiment in the method of calculating an intermediate data generation cost of the PDL data group of interest by the PDL interpreter 13-1.

Let $C_{dl}$ be an intermediate data generation cost, dl_weight and dl_weight2 be weighting parameters of the intermediate data generation cost, object_type be a value which represents a type of rendering command to be compared, object_type_2_cost be an array that associates the object_type and a cost of DL generation processing with each other, and generated_dl_size be the number of already generated rendering commands. Then, the PDL interpreter 13-1 can calculate an intermediate data generation cost. Note that the type of the rendering command to be compared is the same as that of the already generated rendering command.

$$C_{dl} = dl\_weight \times object\_type\_2\_cost[object\_type] \times generated\_dl\_size^{dl\_weight2}$$

Then, the value object_type which represents the type of rendering command to be compared, and the array object_type_2_cost that associates the object type and the cost of the DL generation processing with each other will be described below. FIG. 14 shows correspondence between the types of rendering commands and the values object_type that represent the types of rendering commands. Also, FIG. 14 shows correspondence between the values object_type that represent the types of rendering commands and the array object_type_2_cost that associates the object types and costs of the DL generation processing with each other. An image forming apparatus 12 has, for example, an array corresponding to information defined by this table (FIG. 14) in advance. This implements a cost information holding unit.

Based on the information defined in advance in FIG. 14, for example, for a rendering command associated with compressed data, the PDL interpreter 13-1 can acquire a DL generation processing cost=4.

Likewise, based on the defined information, the PDL interpreter 13-1 can acquire DL generation processing costs of respective processes listed in the first embodiment: 10 for a shading rendering command process; 10 for a tile rendering command process; 1 for a tile rendering command process; 1 for a path rendering command process; 2 for a color conversion command process; 2 for a font rendering command process; 7 for a bitmap rendering command generation process; and 3 for an edge rendering command process.

As described above, in this embodiment as well, the same effects as in the first to fourth embodiments can be obtained.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-120395, filed May 18, 2009, which is hereby incorporated by reference herein in its entirety.

What is claimed is:

1. An image forming apparatus including a plurality of processors which perform interpretation processing of rendering commands and image forming processing, comprising:
   an accelerating processing determination unit which determines a process that allows accelerating processing, which is defined in advance, of processes included in the rendering commands;
   a processing cost determination unit which compares a processing cost calculated when the accelerating processing defined for each type of process is applied to the process which is determined by the accelerating processing determination unit to allow the accelerating processing with a processing cost calculated when the accelerating processing is not applied, and determines whether or not to apply the accelerating processing;
   a processing unit generation determination unit which determines based on the determination result of the processing cost determination unit whether or not to generate a new processing unit required for the plurality of processors to process the process determined to allow the accelerating processing;
   a generation unit which generates the process determined to allow the accelerating processing, in the new processing unit based on the determination result of the processing unit generation determination unit; and
   an accelerating processing execution unit which controls the plurality of processors to execute the process in the new processing unit generated by the generation unit,
   wherein the accelerating processing execution unit controls the processor different from the processor which performs the image forming processing to execute at least a part of the new processing unit.

2. The apparatus according to claim 1, wherein
the processing cost determination unit includes:
   an accelerating processing cost determination unit which calculates an accelerating processing cost required to generate intermediate data by accelerating the process which is determined by the accelerating processing determination unit to allow the accelerating processing using a calculation formula defined for each type of process;
   an intermediate data generation cost determination unit which calculates an intermediate data generation cost required to generate the intermediate data without accelerating the process which is determined by the accelerating processing determination unit to allow the accelerating processing using a calculation formula defined for each type of process; and
   an occupation rate acquisition unit which acquires an occupation rate of a process in each of the plurality of processors, and
the processing unit generation determination unit generates the process in the new processing unit when the accelerating processing cost is smaller than the intermediate data generation cost and the occupation rate is smaller than a threshold which is defined in advance.

3. The apparatus according to claim 1, wherein the accelerating processing determination unit determines at least one process of a process associated with compressed data, a shading rendering command process, a tile rendering command process, a path rendering command process, a color conversion process, a font rendering command process, a bitmap rendering command process, and an edge rendering command process of the processes included in the rendering commands as the process which allows the accelerating processing.

4. The apparatus according to claim 3, wherein the accelerating processing cost determination unit calculates the accelerating processing cost from a processing characteristic of the process that is determined by the accelerating processing determination unit to allow the accelerating processing and a load parameter of a process according to the processing characteristic for each process.

5. The apparatus according to claim 4, wherein the processing characteristics of the respective processes included in the rendering commands include:
   a size of the compressed data and a compression method in case of the process associated with the compressed data;
   a type of shading command and a size to be rendered in case of the shading rendering command process;
   a size of a cell to be rendered as a tile and a rendering size of the tile in case of the tile rendering command process;
   the number of path point sequences of a path in case of the path rendering command process;
   the number of colors to be converted and a type of color conversion process in case of the color conversion process;
   the number of characters of each font, the number of types of fonts, and character sizes in case of the font rendering command process;
   a size of a bitmap and the number of color channels in case of the bitmap rendering command process; and
   a size to be rendered of an edge and the number of color channels in case of the edge rendering command process.

6. The apparatus according to claim 2, wherein the intermediate data generation cost determination unit sets a maximum value of a cost settable by the processors when a size of the intermediate data which has already been generated is not less than a predetermined threshold, and sets a minimum value of the cost settable by the processors when the size of the intermediate data is smaller than the threshold.

7. The apparatus according to claim 2, wherein the intermediate data generation cost determination unit determines the cost from the number of processes included in the rendering commands and a weighting parameter which is defined in advance.

8. The apparatus according to claim 2, further comprising a cost information holding unit which defines and holds costs required for intermediate data generation corresponding to the respective processes included in the rendering commands,
wherein the intermediate data generation cost determination unit determines the intermediate data generation cost from a product of the number of processes which have the same type of process as a process of interest and are already complete, a weighting parameter which is defined in advance, and the cost held by the cost information holding unit.

9. The apparatus according to claim 1, wherein the processing unit generation determination unit determines the processor which executes the process from the plurality of processors based on a value of the occupation rate.

10. The apparatus according to claim 1, further comprising a unit which distributes loads between the interpretation processing and the image forming processing to the plurality of processors or optimizes the interpretation processing for each new processing unit.

11. A method of controlling an image forming apparatus including a plurality of processors which perform interpretation processing of rendering commands and image forming processing, comprising:
an accelerating processing determination step of controlling an accelerating processing determination unit of the image forming apparatus to determine a process that allows accelerating processing, which is defined in advance, of processes included in the rendering commands;
a processing cost determination step of controlling a processing cost determination unit of the image forming apparatus to compare a processing cost calculated when the accelerating processing defined for each type of process is applied to the process which is determined in the accelerating processing determination step to allow the accelerating processing with a processing cost calculated when the accelerating processing is not applied, and to determine whether or not to apply the accelerating processing;
a processing unit generation determination step of controlling a processing unit generation determination unit of the image forming apparatus to determine based on the determination result in the processing cost determination step whether or not to generate a new processing unit required for the plurality of processors to process the process determined to allow the accelerating processing;
a generation step of controlling a generation unit of the image forming apparatus to generate the process determined to allow the accelerating processing in the new processing unit based on the determination result in the processing unit generation determination step; and
an accelerating processing execution step of controlling an accelerating processing execution unit of the image forming apparatus to control the plurality of processors to execute the process in the new processing unit generated in the generation step,
wherein in the accelerating processing execution step, the processor different from the processor which performs the image forming processing is controlled to execute at least a part of the new processing unit.

12. A non-transitory computer-readable storage medium storing an executable program for causing a computer to function as:
an accelerating processing determination unit which determines a process that allows accelerating processing, which is defined in advance, of processes included in the rendering commands;
a processing cost determination unit which compares a processing cost calculated when the accelerating processing defined for each type of process is applied to the process which is determined by the accelerating processing determination unit to allow the accelerating processing with a processing cost calculated when the accelerating processing is not applied, and determines whether or not to apply the accelerating processing;
a processing unit generation determination unit which determines based on the determination result of the processing cost determination unit whether or not to generate a new processing unit required for the plurality of processors to process the process determined to allow the accelerating processing;
a generation unit which generates the process determined to allow the accelerating processing in the new processing unit based on the determination result of the processing unit generation determination unit; and
an accelerating processing execution unit which controls the plurality of processors to execute the process in the new processing unit generated by the generation unit,
wherein the accelerating processing execution unit controls the processor different from the processor which performs the image forming processing to execute at least a part of the new processing unit.

* * * * *